US007580787B2

(12) United States Patent
Nakamura

(10) Patent No.: US 7,580,787 B2

(45) Date of Patent: Aug. 25, 2009

(54) VEHICLE AND CONTROL DEVICE AND CONTROL METHOD FOR THE SAME

(75) Inventor: Kazuo Nakamura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 12 days.

(21) Appl. No.: 12/105,191

(22) Filed: Apr. 17, 2008

(65) Prior Publication Data

US 2009/0012692 A1 Jan. 8, 2009

(30) Foreign Application Priority Data

Apr. 17, 2007 (JP) ............................. 2007-107736

(51) Int. Cl.

*F02D 45/00* (2006.01)
*F02D 41/02* (2006.01)
*G06F 19/00* (2006.01)

(52) U.S. Cl. ...................................................... 701/102

(58) Field of Classification Search ................. 701/102, 701/101, 112, 113; 123/399, 361
See application file for complete search history.

(56) References Cited

U.S. PATENT DOCUMENTS 3,821,943 A * 7/1974 Toda et al. .................. 123/327
4,499,724 A * 2/1985 Ikenoya et al. ................ 60/290

FOREIGN PATENT DOCUMENTS

JP 10-073054 3/1998

* cited by examiner

*Primary Examiner*—Hieu T Vo
(74) *Attorney, Agent, or Firm*—Hogan & Hartson LLP

(57) ABSTRACT

A motorcycle includes a carburetor, an electronically controlled opening/closing valve that opens and closes an intake passage, an ECU that controls the opening/closing valve, a main switch, an engine start switch and a rotation speed sensor. The ECU causes the opening/closing valve to perform a determined initial operation if a determined condition is satisfied when the main switch is turned on. If the determined condition is not satisfied when the main switch is turned on, the determined initial operation is performed when the rotation speed of the engine has reached a determined rotation speed range after the engine has been started. To ensure that an initial operation of an opening/closing valve that opens and closes an intake passage is performed with a high degree of reliability.

9 Claims, 6 Drawing Sheets

VEHICLE AND CONTROL DEVICE AND CONTROL METHOD FOR THE SAME

RELATED APPLICATIONS

This application claims the benefit of priority under 35 USC 119 of Japanese patent application no. 2007-107736, filed on Apr. 17, 2007, which application is hereby incorporated by reference in its entirety.

BACKGROUND OF THE INVENTION

1. Field of the Invention

The present invention relates to a control device and method for a vehicle.

2. Description of Related Art

Vehicles using a carburetor, which is a mechanical vaporizing device, are known. In a vehicle using a carburetor, depending on the combustion state of an engine, a catalyst provided in an exhaust gas passage may be burned or suffer degradation. More specifically, when the ignition is cut, for example, when the engine over-revs and the engine speed exceeds an allowable maximum rotation speed, or when the engine is turned off, unburned fuel may flow into the exhaust gas passage. Unburned fuel that flows into the exhaust gas passage may self-ignite and cause the catalyst to be burned or suffer thermal degradation. Further, the unburned fuel and the catalyst will react, resulting in poorer catalyst performance.

In light of these problems, Japanese Patent No. 2860084 discloses a solenoid opening/closing valve that is provided in a fuel passage of a carburetor. When an abnormality occurs in the combustion state of the engine, the solenoid opening/closing valve is controlled to limit the supply of fuel to the engine.

Fuel such as gasoline includes impurities such as gummy residue. Therefore, when the engine is stopped for a long time, the solenoid opening/closing valve may stick or have difficulty in moving smoothly due to the impurities in the fuel.

Accordingly, an initial operation of the solenoid opening/closing valve is preferably performed when the vehicle is activated to confirm that the solenoid opening/closing valve is operating smoothly. More specifically, when the vehicle is activated, the solenoid opening/closing valve is preferably driven one or more times. A rider can hear the driving sound of the solenoid opening/closing valve, and can determine whether or not an abnormality of the solenoid opening/closing valve has occurred. In addition, causing the solenoid opening/closing valve to perform the initial operation makes it possible to ensure smooth operation of the solenoid opening/closing valve even if it was not operating smoothly beforehand.

However, when the battery voltage of the vehicle is lower than the drive voltage of the solenoid opening/closing valve, the initial operation of the solenoid opening/closing valve cannot be performed. For example, in a vehicle in which the engine is started by electric power using a starter or the like, the drive voltage of the solenoid opening/closing valve is normally lower than the drive voltage of the starter. Therefore, when the engine is started, it is unlikely that the initial operation of the solenoid opening/closing valve will be performed. In addition, when the rider uses a kick starter or pushes the vehicle to forcibly run it, the engine is forcibly rotated and thereby started. In such a case, the engine is started even if the battery voltage of the vehicle is lower than the drive voltage of the solenoid opening/closing valve. In such a case when the rider starts the engine manually without using a starter or the like, the initial operation of the solenoid opening/closing valve may not be performed.

In addition, when the solenoid opening/closing valve is driven, the fuel supply to the engine is temporarily stopped. Accordingly, the initial operation of the solenoid opening/closing valve is preferably not performed when the engine speed is relatively high. Therefore, the initial operation is preferably not performed in a case where the engine is started at the same time as when the vehicle is activated, and thereafter the engine speed immediately increases. This is because, if the initial operation of the solenoid opening/closing valve is performed, for example, when the vehicle is accelerated from standstill by opening the throttle at the same time as when the vehicle is activated, the engine speed may not increase smoothly in accordance with an increase in throttle opening degree.

In light of the above, the initial operation may not be performed if the engine speed is higher than a determined rotation speed when the vehicle is activated.

If the initial operation of the solenoid opening/closing valve is not performed, the rider cannot easily notice the occurrence of an abnormality, such as sticking of the solenoid opening/closing valve. Accordingly, the rider may run the vehicle in spite of such abnormality, and the solenoid opening/closing valve may not operate properly when fuel to the engine is to be cut.

This problem does not uniquely occur when a solenoid opening/closing valve is used. Rather, it generally occurs when any electronically controlled opening/closing valve that is driven by electric power is used.

SUMMARY OF THE INVENTION

The invention addresses these problems and ensures that the initial operation of an opening/closing valve that opens and closes an intake passage is performed with a high degree of reliability.

A vehicle according to the invention includes a fuel tank, an engine, an intake passage, a fuel supply device, an electronically controlled opening/closing valve, a control unit, a power source, a main switch, an engine start switch, and a rotation speed sensor. The fuel tank stores fuel. The intake passage supplies air to the engine. The fuel supply device is connected to the fuel tank and supplies the fuel to the intake passage. The control unit controls the opening/closing valve to open and close the intake passage. The power source supplies electric power to the control unit. The main switch turns on/off the power source. The engine start switch starts the engine. The rotation speed sensor detects a rotation speed of the engine and outputs the detected rotation speed of the engine to the control unit.

The control unit includes a valve drive unit and an output unit. The valve drive unit causes the opening/closing valve to perform a determined initial operation when an initial operation signal is input. The output unit outputs the initial operation signal to the valve drive unit if a determined condition is satisfied when the main switch is turned on. If the determined condition is not satisfied when the main switch is turned on, the output unit outputs the initial operation signal to the valve drive unit when the rotation speed of the engine has reached a determined rotation speed range after the engine has been started.

A control device according to the invention is for a vehicle that includes a fuel tank that stores fuel, an engine, an intake passage that supplies air to the engine, a fuel supply device that is connected to the fuel tank and supplies the fuel to the intake passage, an electronically controlled opening/closing valve that opens and closes the intake passage, a power source, a main switch that turns on/off the power source, an engine start switch that starts the engine, and a rotation speed sensor that detects a rotation speed of the engine.

The control device according to the invention includes a valve drive unit and an output unit. The valve drive unit causes the opening/closing valve to perform a determined initial operation when an initial operation signal is input. The output unit outputs the initial operation signal to the valve drive unit if a determined condition is satisfied when the main switch is turned on. If the determined condition is not satisfied when the main switch is turned on, the output unit outputs the initial operation signal to the valve drive unit when the rotation speed of the engine has reached a determined rotation speed range after the engine has been started.

A control method according to the invention is for a vehicle that includes a fuel tank that stores fuel, an engine, an intake passage that supplies air to the engine, a fuel supply device that is connected to the fuel tank and supplies the fuel to the intake passage, an electronically controlled opening/closing valve that opens and closes the intake passage, a power source, a main switch that turns on/off the power source, an engine start switch that starts the engine, and a rotation speed sensor that detects a rotation speed of the engine.

The control method according to the invention causes the opening/closing valve to perform an initial operation if a determined condition is satisfied when the main switch is turned on. On the other hand, if the determined condition is not satisfied when the main switch is turned on, the control method causes the opening/closing valve to perform the initial operation when the rotation speed of the engine has reached a determined rotation speed range after the engine has been started.

According to the invention, the initial operation of the opening/closing valve that opens and closes the intake passage is performed with a high degree of reliability.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Schematic Structure of Motorcycle 1

A motorcycle 1 according to an embodiment of the invention is now described with reference to the drawings. Motorcycle 1 is just one example of a vehicle, and the invention is not limited to this. A vehicle according to the invention may be a straddle-type vehicle other than a motorcycle, such as an ATV (All Terrain Vehicle).

Figure 1:
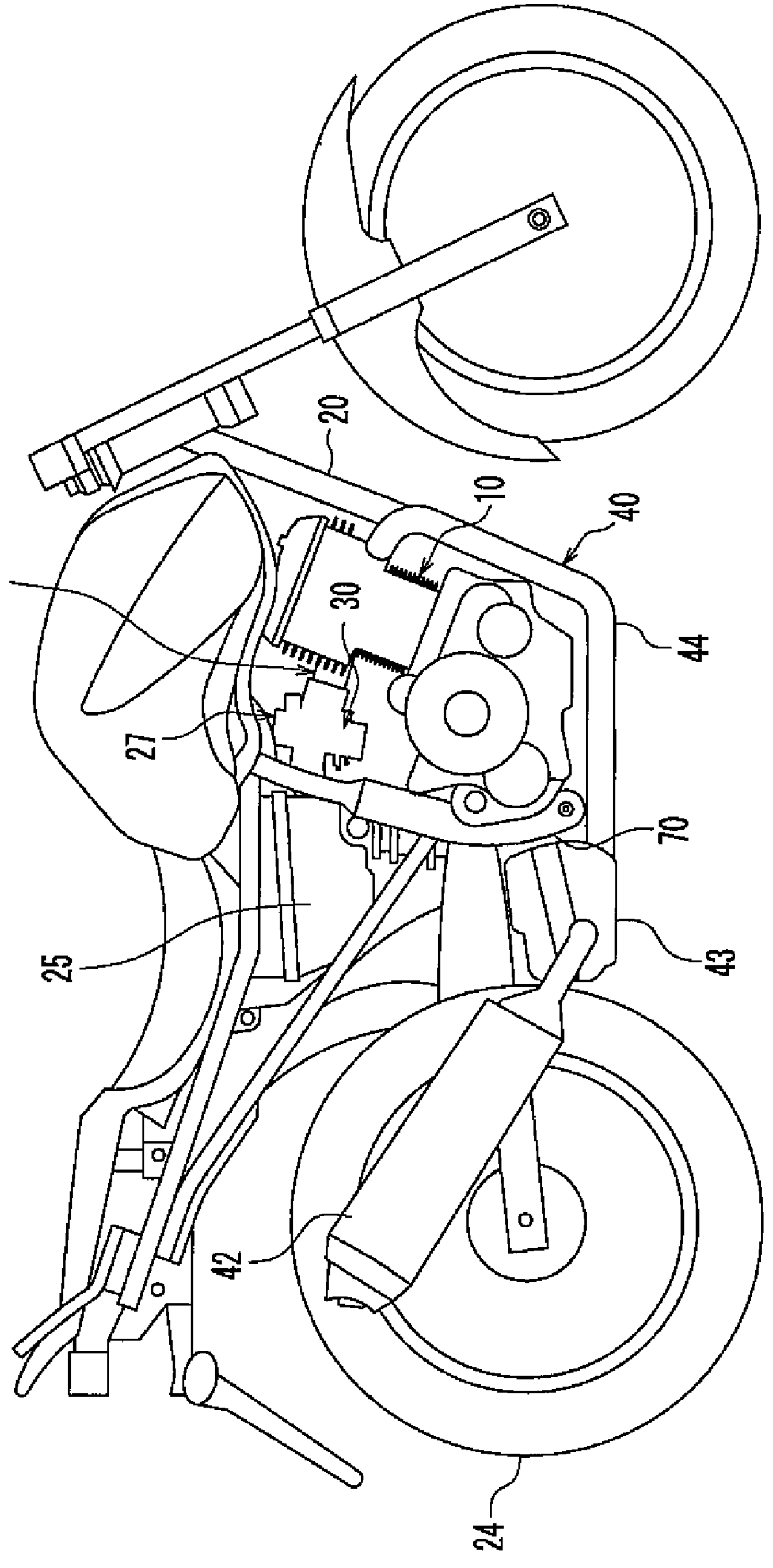
FIG. 1 is a side view of a motorcycle according to the invention.

As shown in FIG. 1, motorcycle 1 includes an engine 10 is suspended from a body frame 21. Engine 10 is connected to a rear wheel 24 via power transmission means such as a transmission, a clutch, a chain, a drive shaft, etc.

A kick starter 70 having a kick lever is attached to engine 10. A rider can start engine 10 by operating kick starter 70. Specifically, a crank shaft of engine 10 is cranked when the rider operates kick starter 70 to start engine 10. Motorcycle 1 of this embodiment is a small size vehicle with a relatively small displacement of 250 cc or less. Therefore, the rider can push start engine 10 by pushing motorcycle 1 to make it run.

Figure 2:
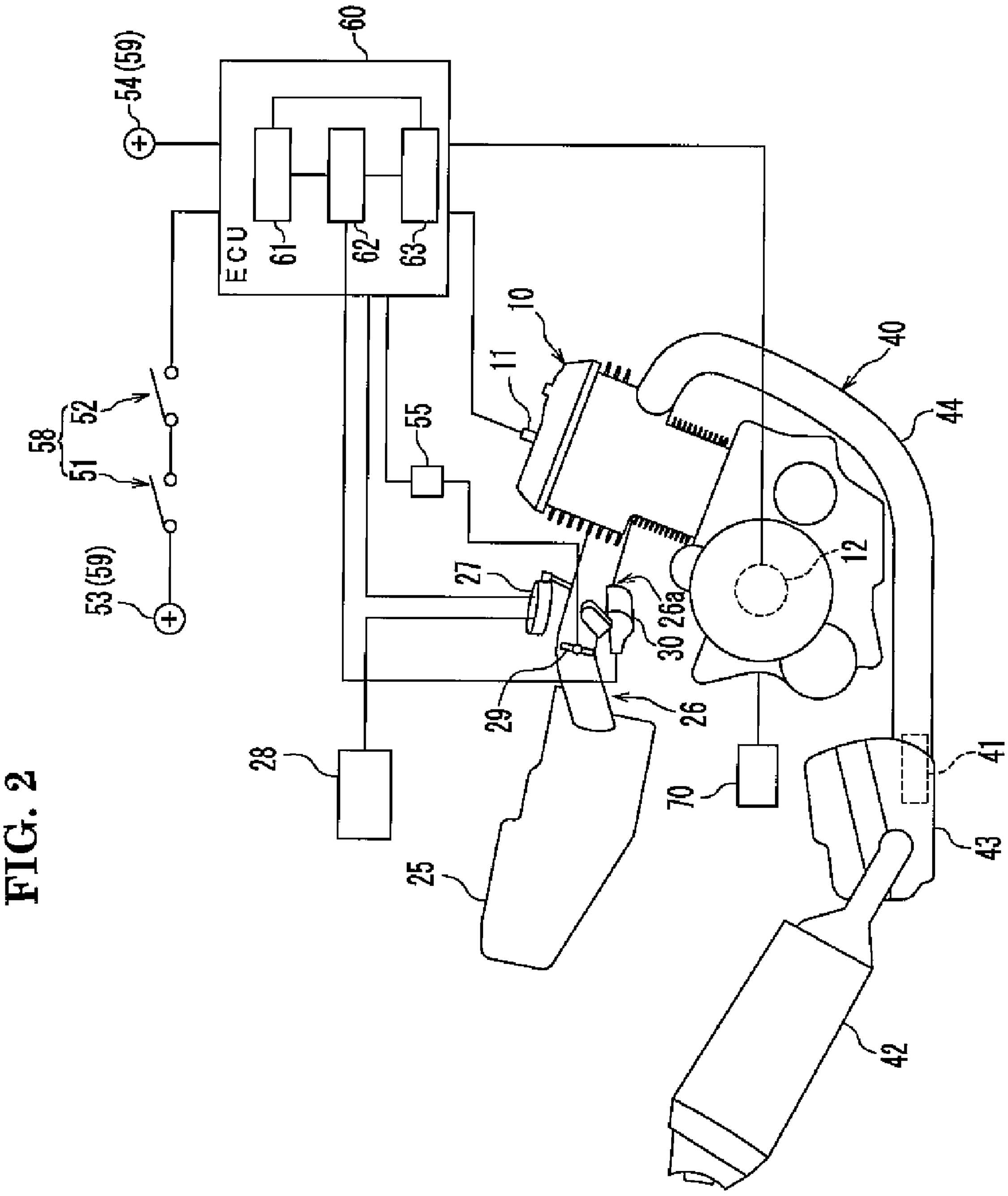
FIG. 2 is a schematic structural view of an engine and the vicinity of an ECU.

As shown in FIG. 2, engine 10 is connected to an air cleaner 25 via an intake passage 26. Air cleaner 25 cleans air introduced from an intake port formed in air cleaner 25. Air cleaned by air cleaner 25 is supplied to a combustion chamber of engine 10 via intake passage 26.

A carburetor 27 serving as a fuel supply device is provided at an intermediate section of intake passage 26. Carburetor 27 is connected to a fuel tank 28 in which fuel, such as gasoline, is stored. Carburetor 27 supplies fuel from fuel tank 28 to intake passage 26. The section of intake passage 26 to which carburetor 27 is connected is a venturi section **26*a* having an inside diameter smaller than that of other sections. When engine 10 is driven, a negative pressure is generated at venturi section 26*a*. Due to this negative pressure, fuel supplied from carburetor 27 is atomized. The atomized fuel is mixed with air in intake passage 26 to produce an air-fuel mixture that is supplied to the combustion chamber of engine 10**.

Figure 3:
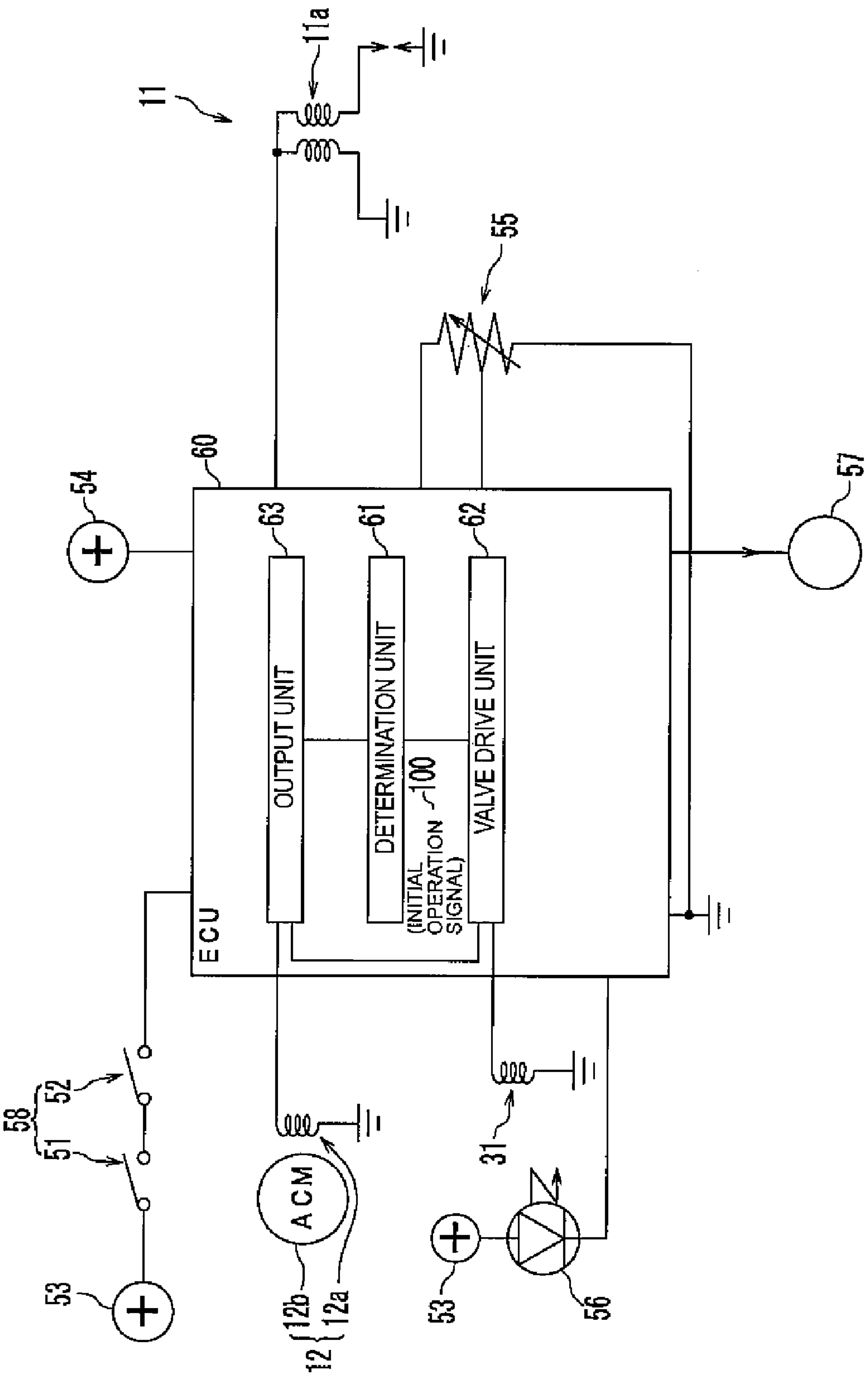
FIG. 3 is a block diagram of a control system of the motorcycle.

Engine 10 is provided with an ignition device 11 that has an igniter coil **11*a*, as shown in FIG. 3. The air-fuel mixture supplied to the combustion chamber of engine 10 is compressed, and combusted by ignition device 11. As a result, the crank shaft of engine 10 rotates, thereby producing power. A rotation speed sensor 12 attached to engine 10 detects the rotation speed of the crank shaft of engine 10. Rotation speed sensor 12 may be any device as long as it can detect the rotation speed of engine 10. In this example, as shown in FIG. 3, rotation speed sensor 12 is formed by a pulser coil 12*a* and an AC magnet (ACM) 12*b***.

The air-fuel mixture combusted in engine 10 becomes exhaust gas and is discharged to the outside of engine 10 through an exhaust gas passage 40. Exhaust gas passage 40 includes an exhaust pipe 44 connected to engine 10, a muffler 42 and a catalyst section 43 positioned between exhaust pipe 44 and muffler 42. Exhaust gas that has reached catalyst section 43 through exhaust pipe 44 is purified using a catalyst 41 in catalyst section 43. Then, the purified exhaust gas is discharged from muffler 42. The type of catalyst 41 is not particularly limited and is selected appropriately depending on the type, displacement, and the like of motorcycle 1.

An electronically controlled opening/closing valve 30 provided in intake passage 26 opens and closes intake passage 26. In this embodiment, only opening/closing valve 30 is provided to open and close intake passage 26.

Any device may be used for opening/closing valve 30 as long as it is driven by electric power and is electronically controlled. In this example, opening/closing valve 30 is a so-called solenoid valve, which is one type of electromagnetic valve. As shown in FIG. 3, opening/closing valve 30 is formed by a solenoid coil 31 that activates a valve body. When solenoid coil 31 is not supplied with electric power, the valve body does not block intake passage 26. When solenoid coil 31 is supplied with electric power, the valve body is activated to block intake passage 26 and shut off the supply of air-fuel mixture from intake passage 26 to engine 10. When engine 10 is running, opening/closing valve 30 is OFF and therefore does not block intake passage 26.

Opening/closing valve 30 may be provided at any location as long as it can reduce the supply of air-fuel mixture to engine 10. For example, it may be positioned closer to air cleaner 25 than carburetor 27 or closer to engine 10 than carburetor 27.

<Control System of Motorcycle 1>

A control system of motorcycle 1 is described referring mainly to FIG. 3. Motorcycle 1 is controlled mainly by an ECU (Engine Control Unit) 60 serving as a control unit.

Rotation speed sensor 12 formed by pulser coil 12*a* and AC magnet 12*b* sends the detected rotation speed of engine 10 to ECU 60. The rotation speed of engine 10 sent to ECU 60 is displayed on a tachometer 57 which is connected to ECU 60.

In addition, a throttle position sensor (TPS) 55 connected to ECU 60 detects the position of a throttle 29 (FIG. 2). That is, TPS 55 detects the throttle opening degree and sends the detected throttle opening degree to ECU 60.

Igniter coil 11*a* of ignition device 11 is connected to ECU 60. ECU 60 supplies electric power to igniter coil 11*a* at a timing corresponding to the engine speed output from rotation speed sensor 12, the throttle opening degree output from TPS 55, or the like. Further, ECU 60 is also connected to carburetor 27 as shown in FIG. 2. ECU 60 drives carburetor 27 in accordance with the engine speed, the throttle opening degree or the like, thereby controlling the amount of fuel supply to engine 10. Thus, engine 10 is driven in accordance with the operation of throttle 29 or the like.

ECU 60 is connected to a main power source 53 via a main switch 51 and an engine switch 52, which is an engine start switch. When main switch 51 and engine switch 52 are turned on, electric power is supplied from main power source 53 to ECU 60, and ignition device 11 is turned on. As a result, engine 10 is started.

If engine switch 52 or main switch 51 is turned off while engine 10 is being run, engine 10 is turned off. More specifically, when engine switch 52 or main switch 51 is turned off, ignition device 11 is turned off. As a result, engine 10 is stopped. After engine switch 52 or main switch 51 has been turned off, electric power is supplied from an auxiliary power source 54 to ECU 60. In this specification, engine switch 52 and main switch 51 are sometimes collectively referred to as a switch 58, and main power source 53 and auxiliary power source 54 are sometimes collectively referred to as a power source 59.

A warning light 56 connected to ECU 60 lights up when an abnormality occurs, such as a power shortage of main power source 53 or auxiliary power source 54.

ECU 60 is provided with a determination unit 61, a valve drive unit 62 and an output unit 63. Determination unit 61 determines whether or not the rotation speed of engine 10 detected by rotation speed sensor 12 is a determined rotation speed or more, when switch 58 is turned off. Output unit 63 outputs an initial operation signal to valve drive unit 62 only if a determined condition is satisfied when main switch 51 is turned on.

Valve drive unit 62 is connected to determination unit 61 and output unit 63. In addition, valve drive unit 62 is connected to solenoid coil 31 and drives opening/closing valve 30. If determination unit 61 determines that the rotation speed of engine 10 is equal to or higher than a determined rotation speed when switch 58 is turned off, valve drive unit 62 drives opening/closing valve 30 to the ON position so that intake passage 26 is closed. On the other hand, if determination unit 61 determines that the rotation speed of engine 10 is lower than the determined rotation speed when switch 58 is turned off, valve drive unit 62 maintains opening/closing valve 30 in the OFF position so that intake passage 26 is left open. After main switch 51 or engine switch 52 has been turned off, ECU 60 and opening/closing valve 30 are driven by electric power supplied from auxiliary power source 54.

Moreover, valve drive unit 62 causes opening/closing valve 30 to perform a determined initial operation when the initial operation signal is input from the output unit 63. More specifically, when the initial operation signal is input, valve drive unit 62 causes opening/closing valve 30 to perform one or more cycles of an operation in which intake passage 26 is opened and closed. "One cycle" is defined as including an operation in which opening/closing valve 30 closes intake passage 26, and an operation in which opening/closing valve 30 opens intake passage 26. Normally, valve drive unit 62 causes opening/closing valve 30 to perform the operation of opening and closing intake passage 26 a plurality of times when the initial operation signal is input. For example, valve drive unit 62 may cause opening/closing valve 30 to perform the operation of opening and closing intake passage 26, 2-20 times, or about 10 times, when the initial operation signal is input. The operation of opening and closing intake passage 26 may be, for example, a series of operations in which opening/closing valve 30 is held ON for a determined period of time to close intake passage 26, and then held OFF for a determined period of time to open intake passage 26. More specifically, for example, a series of operations, in which opening/closing valve 30 is held ON for 100 msec to close intake passage 26, and is then held OFF for 100 msec to open intake passage 26, may be repeatedly performed ten times. However, in the invention, the content of the initial operation is not particularly limited.

<Operation of Opening/Closing Valve 30>

(Initial Operation of Opening/Closing Valve 30)

The initial operation of opening/closing valve 30 is described with reference to FIG. 4. First, in an initial mode 0 in which both main switch 51 and engine switch 52 have been turned off, when main switch 51 is turned on at step S1, determination unit 61 determines at step S2 whether or not the voltage of main power source 53 is equal to or greater than a determined voltage. That is, determination unit 61 determines whether or not the voltage of main power source 53 is enough to drive solenoid coil 31. More specifically, determination unit 61 determines whether or not the voltage of main power source 53 is equal to or greater than the drive voltage of solenoid coil 31.

When the voltage of main power source 53 is equal to or greater than the determined voltage, the routine proceeds to step S3. At step S3, determination unit 61 determines whether or not the rotation speed of engine 10 is lower than a determined rotation speed. The "determined rotation speed" at step S3 is not particularly limited and may be set appropriately depending on the vehicle model or the like of motorcycle 1. For example, the "determined rotation speed" at step S3 may be set to 1000 rpm or to a value at which it can be determined that engine 10 is not substantially rotating. In other words, step S3 may determine whether or not the rotation speed of engine 10 is substantially undetectable by rotation speed sensor 12.

On the other hand, when it is determined at step S2 that the voltage of main power source 53 is smaller than the determined voltage, the routine proceeds to step S7, which is described later in detail. In addition, when it is determined at step S3 that the engine speed is equal to or higher than the determined rotation speed, the routine also proceeds to step S7.

When it is determined at step S3 that the engine speed is lower than the determined rotation speed, the routine proceeds to step S4. At step S4, the initial operation of opening/closing valve 30 is performed. To be more precise, an initial operation signal 100 is output from output unit 63 to valve drive unit 62, and valve drive unit 62 causes opening/closing valve 30 to perform the initial operation. More specifically, as described above, valve drive unit 62 causes opening/closing valve 30 to perform one or more cycles of the operation of opening and closing intake passage 26.

However, when the engine speed increases to exceed the determined rotation speed during the performance of the initial operation at step S4, valve drive unit 62 cancels the initial operation at that time. The "determined rotation speed" at step S4 is also set appropriately depending on the vehicle model or the like of motorcycle 1. For example, the "determined rotation speed" at step S4 may be set to 1000 rpm or to a value at which it can be determined that engine 10 is not substantially rotating.

At step S5, ECU 60 determines whether or not the initial operation of opening/closing valve 30 has been completed at step S4. When the initial operation of opening/closing valve 30 has been completed, the routine proceeds to step S6, where the mode is switched from initial mode 0 to an initial operation completion mode 1.

At step S7, ECU 60 performs a flag check. When the mode is 1 at step S7, the initial operation is completed and a normal operation state is set. That is, opening/closing valve 30 is driven according to a normal program. On the other hand, when the mode is 0 at step S7, the routine proceeds to step S8. Thus, the routine proceeds from step S7 to step S8, when it is determined at step S2 that the voltage of main power source 53 is less than the determined voltage, or when it is determined at step S3 that the engine speed is equal to or higher than the determined rotation speed, or when it is determined at step S5 that the initial operation has been cancelled.

At step S8, ECU 60 determines whether or not the throttle opening degree detected by TPS 55 is smaller than a determined opening degree. At step S8, basically speaking, it is determined whether or not the rider intends to open the throttle to accelerate. More specifically, it is determined whether or not the throttle opening degree is smaller than an opening degree that reflects the rider's intention to accelerate.

When the throttle opening degree is smaller than the determined opening degree, the routine proceeds to step S9. On the other hand, when the throttle opening degree is equal to or greater than the determined opening degree, the routine returns to step S7.

At step S9, ECU 60 determines whether or not the engine speed detected by rotation speed sensor 12 is within a determined rotation speed range. The "determined rotation speed range" at step S9 is not particularly limited and is set appropriately depending on the vehicle model or the like of motorcycle 1. For example, the determined rotation speed range may be set to approximately 1000-2000 rpm.

The lower limit value of the "determined rotation speed range" is preferably set to be equal to or higher than a rotation speed at which engine 10 does not stop even if opening/closing valve 30 performs the initial operation when the engine speed is at the lower limit value. On the other hand, the upper limit value of the "determined rotation speed range" is preferably set to be lower than an engine speed at which the torque generated in engine 10 rapidly increases. In other words, the upper limit value of the "determined rotation speed range" is preferably set to be lower than an engine speed at which the rider is likely to feel a relatively strong acceleration sensation. That is, the upper limit value of the "determined rotation speed range" is preferably set to be lower than an engine speed at which the ignition timing of engine 10 starts to advance.

Moreover, in a case where a clutch such as a centrifugal clutch that is engaged/disengaged according to the rotation speed is located between engine 10 and rear wheel 24, the above upper limit value is preferably set lower than an engine speed at which the centrifugal clutch is completely engaged. The upper limit value is still more preferably set lower than an engine speed at which the centrifugal clutch is partially engaged.

When it is determined at step S9 that the engine speed is within the determined rotation speed range, the routine proceeds to step S4, and the initial operation is performed as described above. When the engine speed is not within the determined rotation speed range, the routine returns to step S7, and the flag check is performed again.

As described above, in this embodiment, if the initial operation of opening/closing valve 30 is not performed when main switch 51 is turned on, the initial operation of opening/closing valve 30 is definitely performed only once, after engine 10 has been started, at a time when there is limited impact on engine 10 and the running state. Then, after the initial operation of opening/closing valve 30 has been completed, opening/closing valve 30 is set to perform normal operation.

(Normal Operation of Opening/Closing Valve 30)

Next, the normal operation of opening/closing valve 30 will be described with reference to FIG. 5. The normal operation of opening/closing valve 30 descried herein is performed after the initial operation of opening/closing valve 30 has been completed. First, the state of main switch 51 and engine switch 52 is determined at step S11. When main switch 51 and engine switch 52 are in the ON position at step S11, the routine returns to step S11 again. In other words, while main switch 51 and engine switch 52 are in the ON position, step S11 is repeatedly executed at determined intervals. On the other hand, when it is determined that at least one of main switch 51 and engine switch 52 is in the OFF position at step S11, the routine proceeds to step S12.

At step S12, determination unit 61 determines the rotation speed of engine 10. When the engine speed is equal to or higher than a determined rotation speed, the routine proceeds to step S13. At step S13, opening/closing valve 30 is turned on. That is, power supply to opening/closing valve 30 is started. Thus, intake passage 26, which was open when engine 10 was running, is closed. Accordingly, the supply of air-fuel mixture to engine 10 is stopped.

The "determined rotation speed" at step S12 is appropriately set depending on the type of motorcycle 1, and the type, amount, location etc. of catalyst 41. The "determined rotation speed" is preferably set to a speed at which catalyst 41 does not suffer any significant degradation even if opening/closing valve 30 is held in the OFF position, when the rotation speed of engine 10 is lower than the determined rotation speed. In other words, the "determined rotation speed" is preferably set to a rotation speed at which the amount of unburned fuel that reaches catalyst section 43 is not sufficient to cause any significant degradation of catalyst 41, when the rotation speed of engine 10 is lower than the determined rotation speed.

Moreover, the "determined rotation speed" is more preferably set to a speed at which catalyst 41 does not suffer substantial degradation even if opening/closing valve 30 is held in the OFF position, when the rotation speed of engine 10 is lower than the determined rotation speed. In other words, the "determined rotation speed" is more preferably set to a rotation speed at which the amount of unburned fuel that reaches catalyst section 43 is not sufficient to cause catalyst 41 to suffer substantial degradation, when the rotation speed of engine 10 is lower than the determined rotation speed.

For example, the "determined rotation speed" at step S12 may be set in a range of approximately 2000-6000 rpm. In one implementation, the "determined rotation speed" is set to 4000 rpm.

Next, at step 14, ECU 60 determines an elapsed time from when opening/closing valve 30 is turned on. When a determined time or more has elapsed from when opening/closing valve 30 was turned on, the routine proceeds to step S15.

At step S15, opening/closing valve 30 is turned off. That is, the power supply to opening/closing valve 30 is shut off.

The "determined time" at step S14 is appropriately set according to the type of motorcycle 1, and the type, amount, location, etc. of catalyst 41. The "determined time" is preferably set such that catalyst 41 does not suffer any significant degradation when opening/closing valve 30 is turned off at step S15 after the determined time has elapsed. In other words, the "determined time" is preferably set to a time that ensures that the amount of unburned fuel that reaches catalyst section 43 does not cause catalyst 41 to suffer any significant degradation.

Further, the "determined time" is more preferably set such that catalyst 41 does not suffer substantial degradation when opening/closing valve 30 is turned off at step S15 after the determined time has elapsed. In other words, the "determined time" is more preferably set to a time that ensures that the amount of unburned fuel that reaches catalyst section 43 does not cause catalyst 41 to suffer substantial degradation.

For example, the "determined time" at step S14 may be set in a range of approximately 10 seconds to 5 minutes, and preferably in a range of approximately 10 seconds to 3 minutes. In one implementation, the "determined time" is set to approximately 1 minute.

On the other hand, when it is determined at step S12 that the rotation speed of engine 10 is lower than the determined rotation speed, the routine ends without performing steps S13-S15. That is, when the rotation speed of engine 10 is lower than the determined rotation speed, opening/closing valve 30 is not turned on. In other words, when the rotation speed of engine 10 is lower than the determined rotation speed, power is not supplied to opening/closing valve 30.

<Operation and Effects>

As described above, in this embodiment, if the voltage of main power source 53 is greater than the drive voltage of solenoid coil 31, and if the engine speed is relatively low when main switch 51 is turned on, the initial operation of opening/closing valve 30 is performed when main switch 51 is turned on. Further, even if the voltage of main power source 53 is smaller than the drive voltage of solenoid coil 31, or even if the engine speed increases at the same time as when main switch 51 is turned on, the initial operation of opening/closing valve 30 is performed when the throttle opening degree is smaller than the determined opening degree and the engine speed has reached within the determined rotation speed range after engine 10 has been started. That is, even if the initial operation is not performed when main switch 51 is turned on due to low voltage of main power source 53 or the like, the initial operation of opening/closing valve 30 is still reliably performed without adversely effecting drivability.

Moreover, in this embodiment, if the voltage of main power source 53 is equal to or greater than the determined voltage when main switch 51 is turned on and the rotation speed of engine 10 is lower than the determined rotation speed, the initial operation is performed when main switch 51 is turned on. Therefore, when the voltage of main power source 53 is sufficiently high, the initial operation is reliably performed, in principle, before motorcycle 1 starts to run. That is, the initial operation is completed at an early stage.

For example, because the voltage of main power source 53 is lower than the drive voltage of solenoid coil 31, engine 10 may be started by using kick starter 70, or engine 10 may be started by the rider pushing motorcycle 1 to forcibly run it. Even in such cases, the initial operation of opening/closing valve 30 is performed when the throttle opening degree is smaller than the determined opening degree and the engine speed has reached within the determined rotation speed range after engine 10 has been started. Thus, according to the embodiment, the initial operation of opening/closing valve 30 is performed with a high degree of reliability.

When considering normal running of motorcycle 1, the throttle is unlikely to be always open from the starting of engine 10 until engine 10 is turned off, and the engine speed is outside of the determined rotation speed range at step S9. In light of this, the initial operation of opening/closing valve 30 will be reliably performed, except in a very rare case where, for example, engine 10 is started at the same time as when main switch 51 is turned on, and the throttle is constantly held open from the moment when engine 10 is started until when engine 10 is turned off. As a result, the rider can reliably check the operation of opening/closing valve 30. In addition, smooth operation of opening/closing valve 30 is ensured even if it was not operating smoothly beforehand.

Further, in this embodiment, when the engine speed is relatively high, the initial operation of opening/closing valve 30 is not performed. Furthermore, in the case where the throttle opening degree is equal to or greater the determined opening degree, the initial operation of opening/closing valve 30 is also not performed. Accordingly, for example, when motorcycle 1 is running at a relatively high speed, or when the rider attempts to accelerate motorcycle 1, the initial operation is not performed. Thus, deterioration in drivability caused by performing the initial operation of opening/closing valve 30 is suppressed. That is, even in the case where the initial operation is not performed when main switch 51 is turned on due to low voltage of main power source 53 or the like, the initial operation of opening/closing valve 30 is reliably performed without having an adverse effect on drivability.

In addition, it is sufficient if the initial operation of opening/closing valve 30 is performed once. Accordingly, in this embodiment, the initial operation of opening/closing valve 30 is set to be performed only once. However, the initial operation of opening/closing valve 30 may be performed a plurality of times as long as it does not adversely affect the running of motorcycle 1.

A solenoid valve is simple in structure and inexpensive. Therefore, the use of the solenoid valve as opening/closing valve 30 as in this embodiment makes it possible to give motorcycle 1 a simple structure that is inexpensive.

Figure 5:
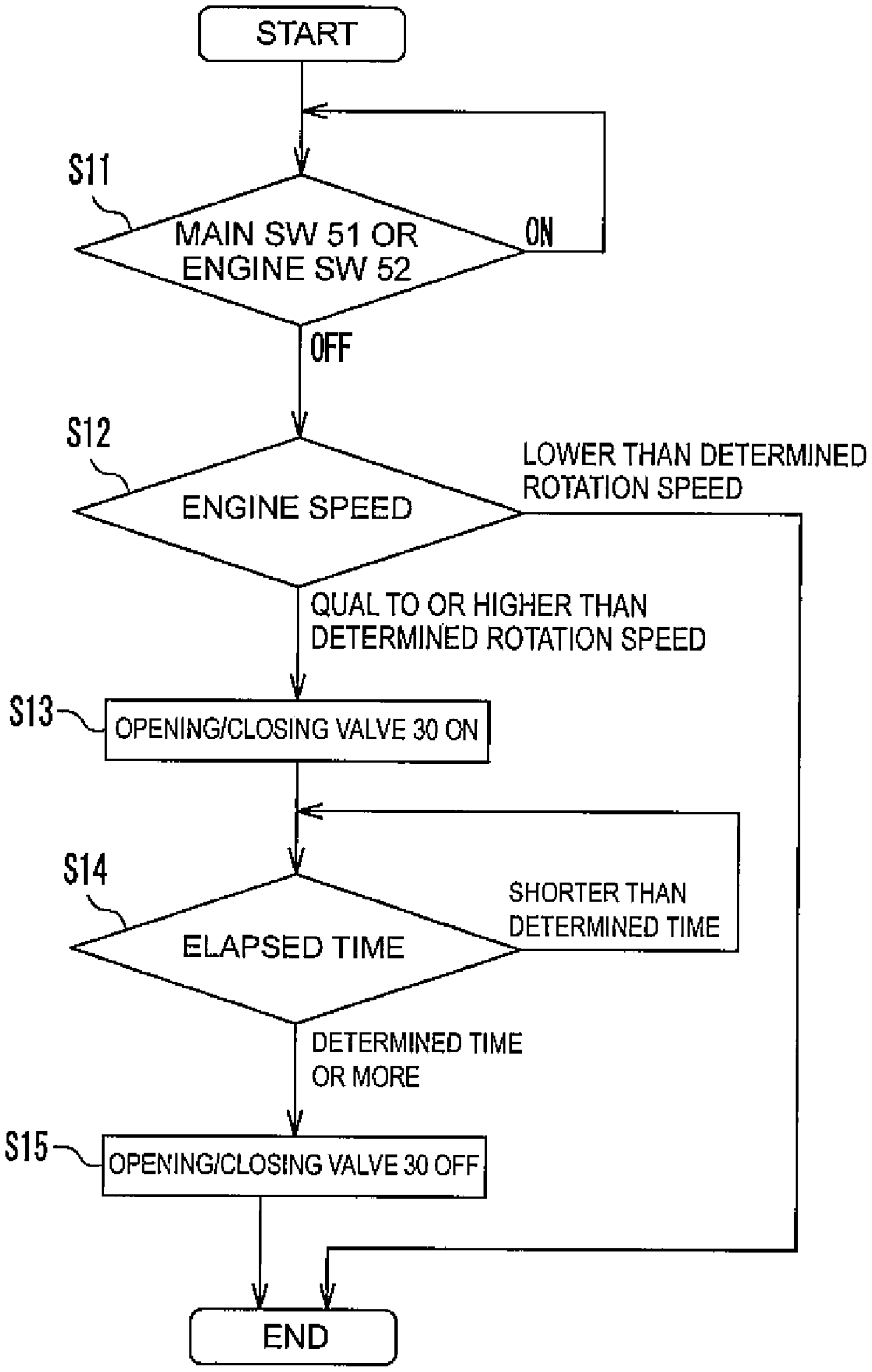
FIG. 5 is a flow chart showing the normal operation of the opening/closing valve.

In addition, in this embodiment, when it is determined at step S12 shown in FIG. 5 that the rotation speed of engine 10 is lower than the determined rotation speed, electric power is not supplied to opening/closing valve 30, and the routine ends with the valve OFF. When, as in this case, the rotation speed of engine 10 is lower than the determined rotation speed, and there is no need to close intake passage 26 using opening/closing valve 30 in order to prevent catalyst 41 from suffering any significant degradation, electric power is not supplied to opening/closing valve 30. Accordingly, electric power consumption of power source 59 is reduced. As a result, the service life of power source 59 is made longer and a power source having a small capacity and a compact size can be used. As a result, motorcycle 1 can be made compact.

The "determined rotation speed" at step S12 is, as described above, a speed at which catalyst 41 does not suffer any significant deterioration even if opening/closing valve 30 is held in the OFF position, when the rotation speed of engine 10 is lower than the determined rotation speed. Therefore, when it is determined at step S12 that the rotation speed of engine 10 is lower than the determined rotation speed, catalyst 41 does not suffer any significant deterioration even if opening/closing valve 30 is not closed.

On the other hand, when it is determined at step S12 shown in FIG. 5 that the rotation speed of engine 10 is equal to or higher than the determined rotation speed, opening/closing valve 30 is turned on and intake passage 26 is closed. Accordingly, if the engine speed is relatively high when engine 10 is stopped, and a large amount of unburned fuel would reach catalyst section 43 if nothing was done, opening/closing valve 30 is closed and a large amount of unburned fuel is prevented from reaching catalyst section 43. As a result, thermal degradation of catalyst 41 is effectively prevented.

In other words, in this embodiment, opening/closing valve 30 can be driven only when it is determined at step S12 shown in FIG. 5 that the rotation speed of engine 10 is equal to or higher than the determined rotation speed, thereby reducing electric power consumption of power source 59 and preventing thermal degradation of catalyst 41.

Moreover, in this embodiment, opening/closing valve 30 is turned off after the determined time has elapsed after it has been turned on at step S3. Therefore, the length of time for which power is supplied to opening/closing valve 30 is made relatively short and electric power consumption of power source 59 is more effectively reduced.

In addition, because opening/closing valve 30 is turned off after the determined time has elapsed, there is no need to separately provide a special sensor or the like, resulting in a reduced cost.

Further, opening/closing valve 30 is reliably turned off after the determined time period has elapsed. Accordingly, motorcycle 1 is prevented from being left unattended with opening/closing valve 30 held in the ON position.

First Modified Example

Figure 4:
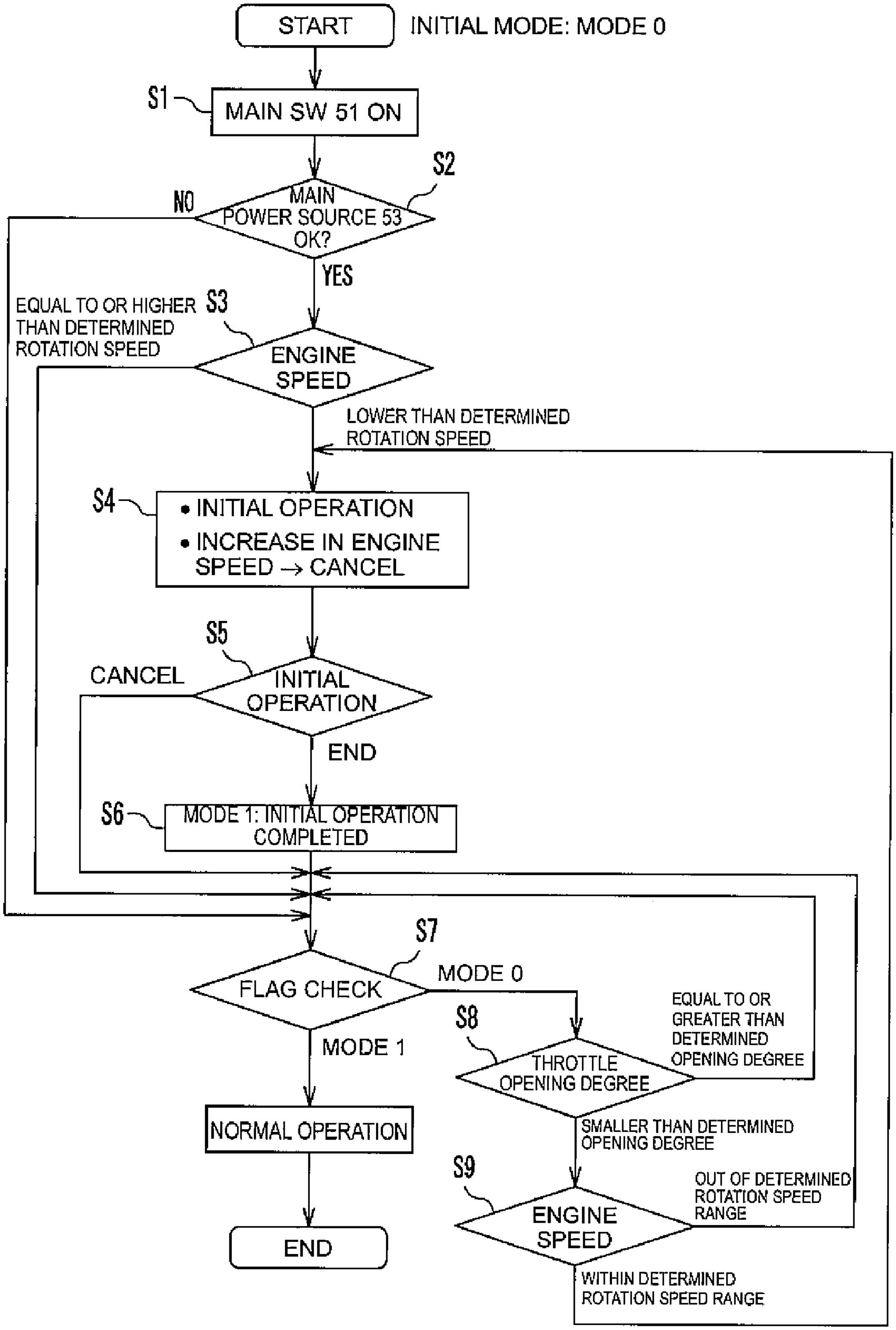
FIG. 4 is a flow chart showing the performance of the initial operation of an opening/closing valve.
Figure 6:
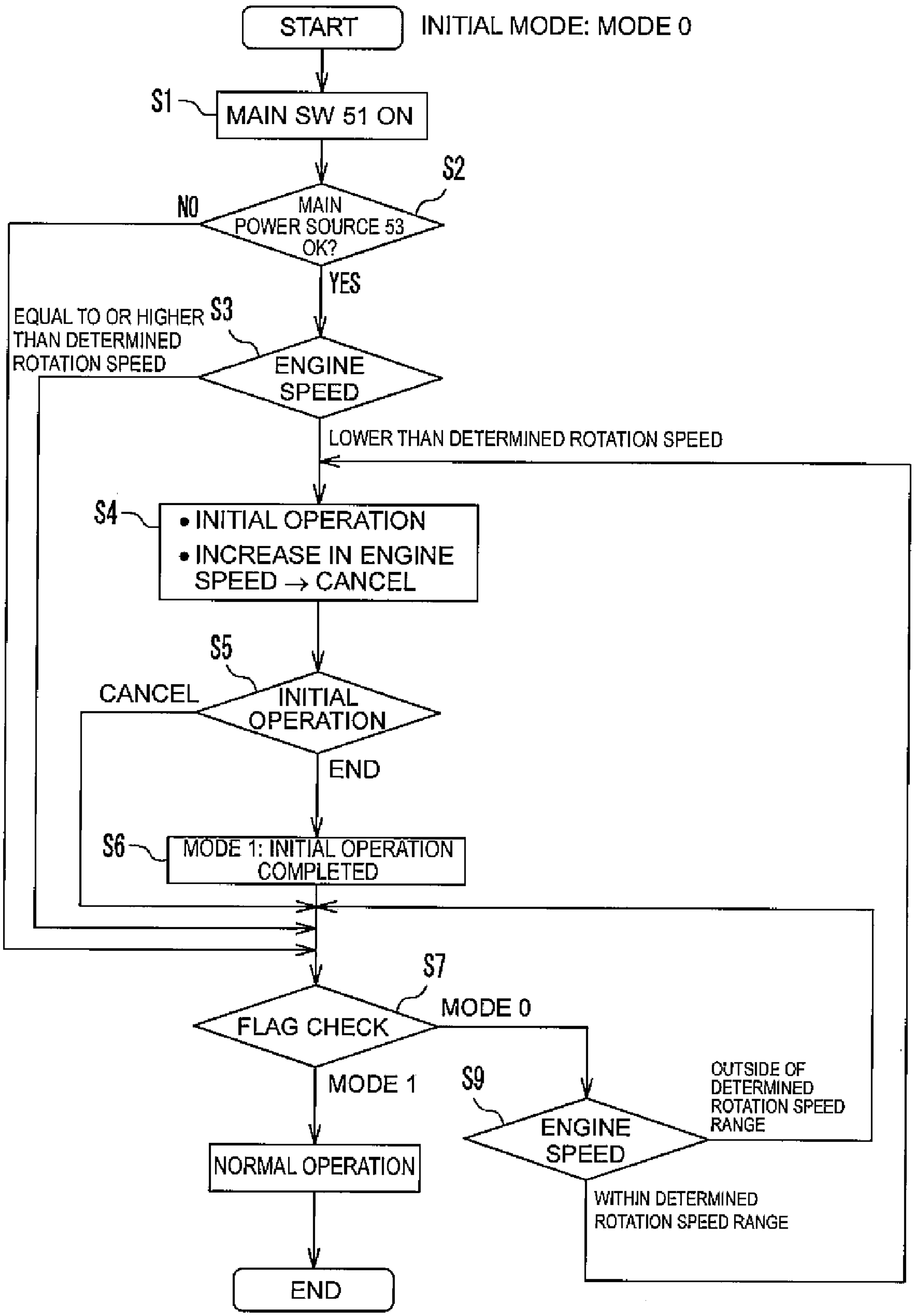
FIG. 6 is a flow chart showing the performance of the initial operation of the opening/closing valve according to a first modified example.

In the above-described embodiment, as shown in FIG. 4, it is determined at step S8 whether or not the throttle opening degree is smaller than the determined opening degree. However, the invention is not limited to this configuration. For example, in the case of a motorcycle that is not provided with TPS 55, step S8 may be omitted as shown in FIG. 6. That is, step S9 may be performed after step S6.

Other Modified Examples

In the above-described embodiment, motorcycle 1 is described as an example of a vehicle according to the invention. However, motorcycle 1 is only one example, and the invention is not limited to this. The vehicle according to the invention may be a straddle-type vehicle other than a motorcycle, such as an ATV (All Terrain Vehicle) and the like.

An example has been described in which the "opening/closing valve" is a solenoid valve. However, any opening/closing valve may be used as long as it is driven by electric power. For example, the opening/closing valve may be a valve that is opened and closed by an electric motor or using an electronically controlled hydraulic cylinder or an air cylinder.

In the above-described embodiment, the normal operation of opening/closing valve 30 is performed only when the engine speed is equal to or more than a determined rotation speed while switch 58 is OFF. However, the invention is not limited to this structure. For example, opening/closing valve 30 may be set such that its normal operation is performed every time switch 58 is turned off, irrespective of the engine speed. Further, for example, the rotation speed of engine 10 may be monitored and opening/closing valve 30 may be held in the ON position until the rotation speed of engine 10 becomes lower than a determined rotation speed. Furthermore, a fuel concentration sensor for detecting the concentration of unburned fuel may be separately provided at catalyst section 43, and opening/closing valve 30 may be held in the ON position until the fuel concentration detected by the fuel concentration sensor becomes lower than a determined concentration.

The invention is applicable to vehicles and is particularly applicable to motorcycles. The invention is most particularly applicable to motorcycles with a relatively small displacement, which can be push started or for which a kick starter can be used to start the engine.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A vehicle comprising:

a fuel tank that stores fuel;

an engine;

an intake passage that supplies air to the engine;

a fuel supply device that is connected to the fuel tank and supplies the fuel to the intake passage;

an electronically controlled opening/closing valve that opens and closes the intake passage;

a control unit that controls the opening/closing valve;

a power source that supplies electric power to the control unit;

a main switch that turns on/off the power source;

an engine start switch that starts the engine; and a rotation speed sensor that detects a rotation speed of the engine and outputs the detected rotation speed of the engine to the control unit, wherein the control unit comprises:

a valve drive unit that causes the opening/closing valve to perform a determined initial operation when an initial operation signal is input; and an output unit that outputs the initial operation signal to the valve drive unit if a determined condition is satisfied when the main switch is turned on, and if the determined condition is not satisfied when the main switch is turned on, outputs the initial operation signal to the valve drive unit when the rotation speed of the engine has reached a determined rotation speed range after the engine has been started.

2. The vehicle according to claim 1, further comprising:

a throttle position sensor that detects a throttle opening degree of the engine and outputs the detected throttle opening degree to the control unit, wherein the output unit outputs the initial operation signal only when the throttle opening degree is smaller than a determined opening degree after the engine has been started.

3. The vehicle according to claim 1, wherein the output unit outputs the initial operation signal if the voltage of the power source is equal to or higher than a determined voltage and if the rotation speed of the engine is lower than a determined rotation speed when the main switch is turned on.

4. The vehicle according to claim 1, wherein the output unit outputs the initial operation signal to the valve drive unit only once.

5. The vehicle according to claim 1, wherein the opening/closing valve includes a solenoid valve.

6. The vehicle according to claim 1, further comprising a kick starter that starts the engine.

7. The vehicle according to claim 1, wherein, when the initial operation signal is input, the valve drive unit causes the opening/closing valve to perform one or more cycles of an operation in which the intake passage is opened and closed.

8. A control device for a vehicle, the vehicle comprising:

a fuel tank that stores fuel;

an engine;

an intake passage that supplies air to the engine;

a fuel supply device that is connected to the fuel tank and supplies the fuel to the intake passage;

an electronically controlled opening/closing valve that opens and closes the intake passage;

a power source;

a main switch that turns on/off the power source;

an engine start switch that starts the engine; and a rotation speed sensor that detects a rotation speed of the engine, the control device comprising:

a valve drive unit that causes the opening/closing valve to perform a determined initial operation when an initial operation signal is input; and an output unit that outputs the initial operation signal to the valve drive unit if a determined condition is satisfied when the main switch is turned on, and if the determined condition is not satisfied when the main switch is turned on, outputs the initial operation signal to the valve drive unit when the rotation speed of the engine has reached a determined rotation speed range after the engine has been started.

9. A control method for a vehicle, the vehicle comprising:

a fuel tank that stores fuel;

an engine;

an intake passage that supplies air to the engine;

a fuel supply device that is connected to the fuel tank and supplies the fuel to the intake passage;

an electronically controlled opening/closing valve that opens and closes the intake passage;

a power source;

a main switch that turns on/off the power source;

an engine start switch that starts the engine; and a rotation speed sensor that detects a rotation speed of the engine, the control method comprising the step of:

causing the opening/closing valve to perform an initial operation if a determined condition is satisfied when the main switch is turned on, and if the determined condition is not satisfied when the main switch is turned on, causing the opening/closing valve to perform the initial operation when the rotation speed of the engine has reached a determined rotation speed range after the engine has been started.

* * * * *